United States Patent
Hagiwara et al.

(10) Patent No.: US 11,823,506 B2
(45) Date of Patent: Nov. 21, 2023

(54) DRIVING EVALUATION APPARATUS

(71) Applicant: Honda Motor Co., Ltd., Tokyo (JP)

(72) Inventors: Yuki Hagiwara, Tokyo (JP); Takahiro Oyama, Tokyo (JP); Akihiro Hirashima, Tokyo (JP); Tomoyuki Nitta, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 530 days.

(21) Appl. No.: 17/266,705

(22) PCT Filed: Aug. 1, 2019

(86) PCT No.: PCT/JP2019/030160
§ 371 (c)(1),
(2) Date: Feb. 8, 2021

(87) PCT Pub. No.: WO2020/031827
PCT Pub. Date: Feb. 13, 2020

(65) Prior Publication Data
US 2021/0304527 A1 Sep. 30, 2021

(30) Foreign Application Priority Data
Aug. 9, 2018 (JP) ................................. 2018-150332

(51) Int. Cl.
*G07C 5/04* (2006.01)
*G01S 19/42* (2010.01)
(Continued)

(52) U.S. Cl.
CPC ................ *G07C 5/04* (2013.01); *G01S 19/42* (2013.01); *G01S 19/52* (2013.01); *G07C 5/008* (2013.01); *G08G 1/052* (2013.01)

(58) Field of Classification Search
CPC ........... G07C 5/04; G07C 5/008; G01S 19/42; G01S 19/52; G08G 1/052; G08G 1/0112; G08G 1/202
(Continued)

(56) References Cited

U.S. PATENT DOCUMENTS 6,408,233 B1 * 6/2002 Solomon .................. G08G 1/20
701/32.4
7,365,640 B2 * 4/2008 Garcia ................ B62D 63/064
340/936
(Continued)

FOREIGN PATENT DOCUMENTS

JP 2004046570 A 2/2004
JP 2007284049 A 11/2007
(Continued)

OTHER PUBLICATIONS

International Preliminary Report on Patentability; Application PCT/JP2019/030160; dated Aug. 9, 2018.
(Continued)

*Primary Examiner* — Omar Casillashernandez
(74) *Attorney, Agent, or Firm* — Duft & Bornsen, PC

(57) ABSTRACT

A driving evaluation apparatus configured to evaluate driving status of driver driving mobile body in preset determination area, includes: a microprocessor and a memory. The microprocessor is configured to function as: an information acquisition unit configured to acquire location information and travel speed information of the mobile body based on GPS signals; a speed excess determination unit configured to determine whether travel speed of the mobile body in the determination area exceeds predetermined travel speed based on the location information and the travel speed information; and a driving evaluation unit configured to evaluate the driving status of the driver in the determination area based on determination result of the speed excess determination. The speed excess determination unit is configured to stop the speed excess determination for predetermined time period when it is determined that the travel speed of the mobile body exceeds the predetermined travel speed.

4 Claims, 9 Drawing Sheets

(51) Int. Cl.
  *G01S 19/52* (2010.01)
  *G07C 5/00* (2006.01)
  *G08G 1/052* (2006.01)
(58) Field of Classification Search
  USPC .......................................................... 340/936
  See application file for complete search history.

(56) References Cited

U.S. PATENT DOCUMENTS

2006/0175774 A1* 8/2006 Garcia ................. B62D 63/064
                                                    180/14.1
2007/0089054 A1* 4/2007 Morimoto ............... B60Q 9/00
                                                    715/700
2008/0059037 A1* 3/2008 Isaji .................... B60W 40/072
                                                    701/93

FOREIGN PATENT DOCUMENTS

JP    2008040766 A    2/2008
WO    2018053252 A1   3/2018

OTHER PUBLICATIONS

International Search Report; Application PCT/JP2019/030160; dated Oct. 21, 2019.
India Office action; Application 202147008465; dated Sep. 30, 2021.

* cited by examiner

DRIVING EVALUATION APPARATUS

CROSS-REFERENCE TO RELATED APPLICATION

This application is a National Stage of PCT international application Ser. No. PCT/JP2019/030160 filed on Aug. 1, 2019 which designates the United States, incorporated herein by reference, and which is based upon and claims the benefit of priority from Japanese Patent Application No. 2018-150332, filed on Aug. 9, 2018, the entire contents of which are incorporated herein by reference.

TECHNICAL FIELD

This invention relates to a driving evaluation apparatus for evaluating driving status of drivers.

BACKGROUND ART

As a technique of this type, there has been conventionally known a device which receives GPS signals by GPS receiver mounted on vehicle, detects the speed of the vehicle based on the GPS signals, and, if there is speed exceedance, notifies vehicle manager outside the vehicle of speed violation information (for example, Patent Document 1). The apparatus of Patent Document 1, when the duration of the speed excess exceeds a predetermined time period, determines that the speed violation has been confirmed and reports the speed violation information.

CITATION LIST

Patent Literature

Patent Document 1: Japanese Unexamined Patent Publication No. 2004-046570

DISCLOSURE OF INVENTION

Problems to be Solved by the Invention

However, GPS signals may not be received continuously depending on the receiving conditions. For this reason, as in the device described in Patent Document 1, if it is a condition for the speed excess determined that the duration of the speed excess exceeds a predetermined time period, it is difficult to appropriately evaluate the driving status of the vehicle.

Means for Solving Problem

An aspect of the present invention is a driving evaluation apparatus configured to evaluate a driving status of a driver driving a mobile body in a preset determination area. The driving evaluation apparatus includes: an information acquisition unit configured to acquire location information and travel speed information of the mobile body based on GPS signals received by a GPS receiver provided on a mobile terminal carried by the driver or provided on the mobile body; a speed excess determination unit configured to conduct a speed excess determination to determine whether a travel speed of the mobile body in the determination area exceeds a predetermined travel speed based on the location information and the travel speed information of the mobile body acquired by the information acquisition unit; a driving evaluation unit configured to evaluate the driving status of the driver in the determination area based on a determination result of the speed excess determination unit; and a timer configured to count time from a time point when it is determined by the speed excess determination unit that the travel speed of the mobile body exceeds the predetermined travel speed to a time point when the predetermined time period elapses. The speed excess determination unit is configured to stop the speed excess determination for a predetermined time period when it is determined that the travel speed of the mobile body exceeds the predetermined travel speed until the timer finishes counting the predetermined time period, irrespective of whether the mobile body is in the determination area.

Effect of the Invention

According to the present invention, it becomes possible to appropriately evaluate driving status of drivers even when the GPS signal cannot be continuously received.

DESCRIPTION OF EMBODIMENT

An embodiment of the present invention is explained with reference to FIG. 1 to FIG. 8 in the following. A driving evaluation apparatus according to the embodiment of the present invention can be applied to management systems that evaluate driving status of workers in charge of driving vehicles in working hours, in various industries. Hereafter, an example will be described in which the present driving evaluation apparatus is applied to a management system of a distribution business or post office that picks up and delivers cargoes by drivers driving vehicles.

[Functional Configuration of Management System 100]

Figure 1:
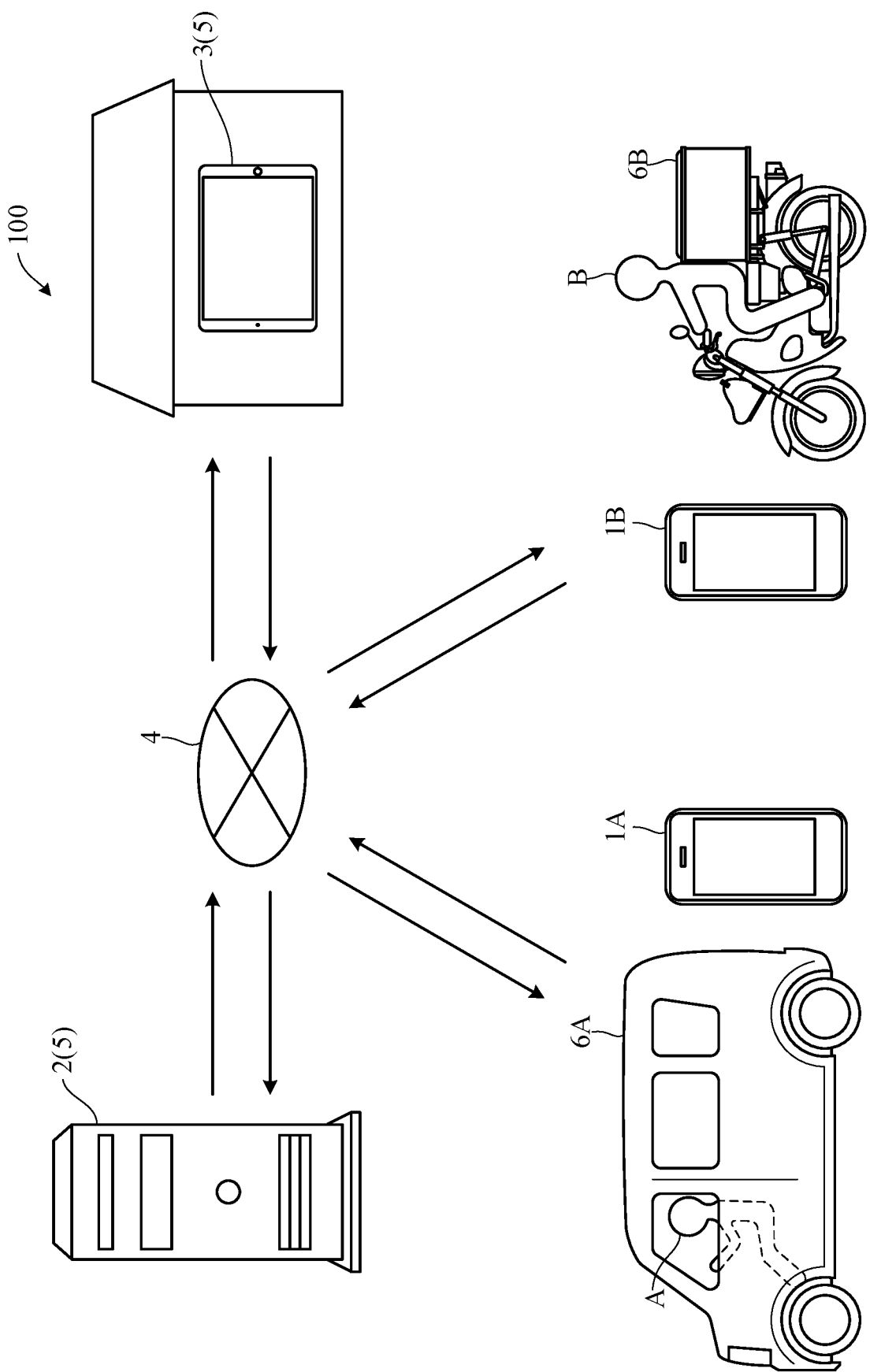
FIG. 1 is a diagram showing an example of configuration of a management system including a driving evaluation apparatus according to an embodiment of the present invention.

First, the function configuration of a management system 100 according to the embodiment of the present invention will be described. FIG. 1 is a diagram showing an example of the configuration of the management system 100. As shown in FIG. 1, the management system 100 includes multiple (two in FIG. 1) driver terminals 1A and 1B, a management server 2, and a manager terminal 3 that are connected through a network 4 which includes a public wireless communication network typified by the Internet network, mobile phone network, or the like. In the management system 100 thus configured, the management server 2 and manager terminal 3 form a driving evaluation apparatus 5 according to the embodiment of the present invention. The management server 2 or manager terminal 3 alone may form the driving evaluation apparatus 5. The network 4 also includes closed communication networks provided for predetermined management areas, such as wireless LANs or Wi-Fi (Wireless Fidelity) (Registered Trademark).

The driver terminals 1A and 1B are held in clothes pockets, bags, pouches, or the like of the drivers A and B who conduct pickup and delivery are visiting the pickup destinations, or disposed in the cradles or the like of vehicles 6A and 6B used for pickup and delivery. In the present embodiment, smartphones or tablet terminals, mobile phones, PDAs (Personal Digital Assistants), and various types of wearable terminals that are connectable to a public wireless communication network are collectively referred to as the driver terminals 1A and 1B. The driver terminals 1A and 1B have the same configuration. The number of driver terminals may be three or more. The vehicles 6A and 6B are transportation vehicles, such as four-wheeled vehicles, motorcycles, bicycles, or carts. FIG. 1 shows a light truck (e.g., a light truck having a predetermined displacement or less) 6A, which is widely being used to pick up and deliver cargoes or mails, and a motorized bicycle (e.g., a motorcycle including a motor having a predetermined displacement or less) 6B as an example.

Next, the configuration of the driver terminals 1A and 1B, management server 2, and manager terminal 3 will be described.

<Driver Terminals 1A, 1B>

First, the driver terminals 1A and 1B will be described. Various types of application software can be installed on the driver terminals 1A and 1B. The driver terminals 1A and 1B according to the present embodiment form a part of the management system in accordance with application software installed in smartphones. By using commercially available smart-phones, the cost of constituting the system can be reduced.

Figure 2:
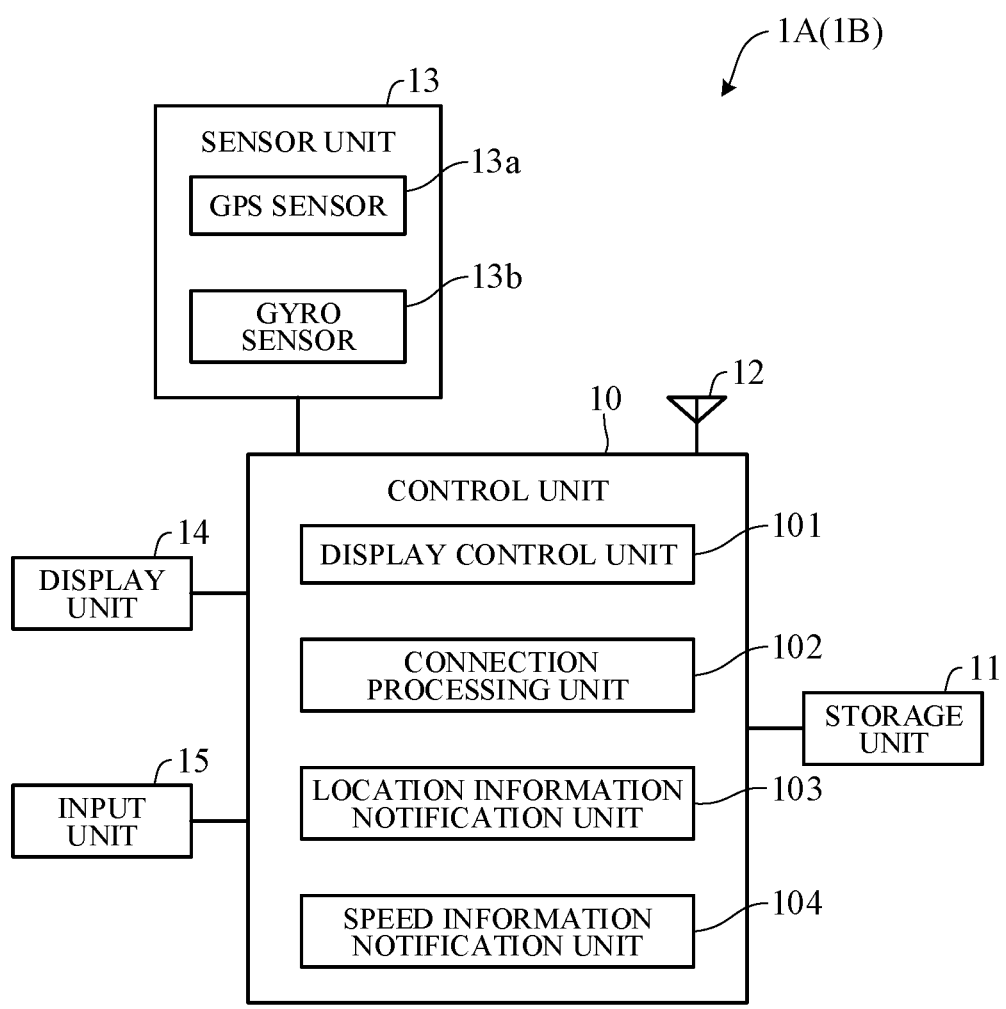
FIG. 2 is a block diagram showing a schematic configuration of a driver terminal in FIG. 1.

FIG. 2 is a block diagram showing a schematic configuration of the driver terminals 1A and 1B. As shown in FIG. 2, the driver terminal 1A includes a control unit 10, a storage unit 11, a wireless unit 12, a sensor unit 13, a display unit 14, and an input unit 15.

The storage unit 11 consists of a semiconductor memory, hard disk, or the like. The storage unit 11 stores various types of information, such as software including an operating system (OS) and application programs for supporting pickup and delivery work, map information, such as road maps and residential maps, and customer information about pickup destinations and delivery destinations. The customer information includes the addresses and phone numbers of the pickup destinations and delivery destinations, as well as customer-related information, such as whether the customers have delivery boxes. The software, map information, and customer information may be previously stored in the storage unit 11, or acquired from the management server 2. The storage unit 11 also stores information including the addresses, phone numbers, designated time slots, and the like of the pickup destinations and delivery destinations assigned to the drivers A and B corresponding to the driver terminals 1A and 1B.

The wireless unit 12 includes a digital signal processor (SP) and the like and is configured to be able to wirelessly communicate with the management server 2 through the wireless communication network typified by a mobile phone network, such as 3G, LTE, 4G, or 5G. The wireless unit 12 may include a near-field wireless communication unit (not shown) capable of using a near-field wireless communication technology, such as Wi-Fi (Registered Trademark) or Bluetooth (Registered Trademark). The wireless unit 12 is able to transmit a login ID for identifying the driver A or B (driver ID), information indicating the current location of the driver A or B or vehicle 6A or 6B, travel speed information, and the like to the management server 2.

The sensor unit 13 includes a GPS sensor 13a that receives locating signals from multiple GPS satellites and measures the absolute location (latitude, longitude) of the driver A or B corresponding to the driver terminal 1A or 1B and a gyro sensor 13b that detects the angular velocity, and the like. The current location may be calculated on the basis of information about the base stations of the wireless communication network acquired from the wireless unit 12. The travel speed of the driver A, B or the vehicle 6A, 6B may be calculated on the basis of time-series changes in the location information acquired by the GPS sensor 13a, i.e., change amount of position coordinates per unit time. Acceleration can be calculated based on the time series change of the travel speed, that is, the change amount per unit time of the travel speed. If it is difficult to receive locating signals from the GPS satellites, the current location of the driver A or B or vehicle 6A or 6B may be calculated using Assisted Global Positioning System (AGPS) communication on the basis of the base station information acquired from the wireless unit 12.

The display unit 14 consists of a display device, such as a liquid crystal display or organic EL panel. The display unit 14 receives an instruction from the control unit 10 and displays a map, a button icon for operating a touchscreen, or the like. The display unit 14 also displays various types of information, such as the current location of the driver A or B or vehicle 6A or 6B, a map around the current location, and a map around the pickup destination and the delivery destination. The display unit 14 is also able to display the pickup and delivery order information stored in the storage unit 11.

The input unit 15 consists of a physical switch, such as a numeric keypad operated by the driver A or B, an input device (not shown), such as a touchscreen disposed so as to be overlaid on the display surface of the display unit 14, or the like.

The input unit 15 outputs a signal based on operation input, such as depression of the numeric keypad or touchscreen by the driver A or B, to the control unit 10. Thus, for example, the screen display of the display unit 14 is changed.

Although not shown, the driver terminals 1A and 1B may further include a speaker, vibrator, light, microphone, and the like. The speaker, vibrator, or light notifies the driver of various types of information through a sound, vibration, or light. The speaker outputs a sound to the driver, and the microphone collects a sound or the like issued from the driver. Thus, various types of information is outputted from the speaker in the form of a sound, and various types of commands inputted in the form of a sound through the microphone by the driver are inputted to the control unit 10 using a sound recognition technology.

The control unit 10 includes a processor having a CPU, RAM, ROM, I/O or the like. The CPU performs prestored programs and transmits and receives signals to and from the storage unit 11, the wireless unit 12, the sensor unit 13, the display unit 14, and the input unit 15. The control unit 10 has a display control unit 101, a connection processing unit 102, a location information notification unit 103, and a speed information notification unit 104, as a functional configuration.

The display control unit 101 generates an image signal in response to an operation on the input unit 15 or in response to the wireless unit 12 receiving various information and transmits the image signal to the display unit 14. Thus, the screen display on the display unit 14 is controlled. The screens that the display control unit 101 causes the display unit 14 to display include a login screen for logging in to the management system 100 and the like.

The connection processing unit 102 transmits, to the management server 2 through the wireless unit 12, a login ID and a password inputted by the driver A or B on the login screen displayed on the display unit 14 through the input unit 15. Thus, the driver terminal 1A or 1B is communicatively connected to the management server 2. The driver performs this login input when starting to work, that is, when departing from the base station. When logout is inputted through the input unit 15, the connection processing unit 102 transmits the logout to the management server 2 through the wireless unit 12. Thus, the communication connection between the driver terminal 1A or 1B and management server 2 is complete. The driver performs this logout input when finishing work, that is, when returning to the base station. Logout may be automatically performed on the basis of the time or location information when the driver returns to the base station.

The location information notification unit 103 transmits current location information of the driver A or B or vehicle 6A or 6B moving with the driver terminal 1A or 1B calculated on the basis of the GPS signals received by the sensor unit 13 (GPS sensor 13a), current time information acquired from a clocking unit (not shown), and the like to the management server 2 through the wireless unit 12 at predetermined time intervals (e.g., at intervals of 1 s) such that these pieces of information are associated with the driver ID. The time information includes not only the time but also information, such as year, month, and date. The management server 2 may calculate the travel speed or moving direction of the driver or vehicle from time-series changes in the location information of the vehicle.

The positions of the drivers A and B or the vehicles 6A and 6B change from moment to moment. For this reason, when current location information is acquired at predetermined time intervals, the position obtained from the latest current location information and the actual position may not exactly match each other. However, the deviation is small and therefore the location obtained from current location information acquired at predetermined time intervals can be considered as the current location. Multiple pieces of information, such as current location information of the driver A or B or vehicle 6A or 6B acquired at predetermined time intervals and current time information may be collectively transmitted at once (so-called "burst transmission"). The time intervals at which current location information of the driver or vehicle is acquired (e.g., time intervals of 1 s), the number of pieces of information transmitted at once when burst-transmitting multiple pieces of information collectively, or the like may be previously set.

The speed information notification unit 104 calculates the travel speed and acceleration of the driver A or B or vehicle 6A or 6B moving with the driver terminal 1A or 1B on the basis of signals from the sensor unit 13 (GPS sensor 13a) and transmits the travel speed and acceleration along with current time information acquired from a clocking unit through the wireless unit 12 at predetermined time intervals (e.g., at intervals of 1 s) such that these pieces of information are associated with the driver ID. The management server 2 may calculate the travel speed and acceleration on the basis of location information transmitted from the location information notification unit 103. The management server 2 may calculate the travel speed based on the location information notified by the location information notification unit 103. In this case, the speed information notification unit 104 is unnecessary.

When a GPS signal from a GPS satellite is blocked by a large structure, mountain, or the like, the GPS sensor 13a may not be able to receive the GPS signal. Location information calculated on the basis of the GPS signal received by the GPS sensor 13a may include an error of several meters to several tens of meters due to an error in the orbit of the GPS satellite, a delay in the propagation of the GPS signal in the ionosphere or troposphere, reflection of the GPS signal by the large structure, mountain, or the like (multipath phenomenon), noise, and others. Similarly, information indicating the travel speed and acceleration calculated on the basis of the location information based on the GPS signal may include an error.

<Management Server 2>

Next, the management server 2 will be described. While, in the present embodiment, the management server 2 is described as a single server having various functions, it may be a distributed server consisting of servers having different functions or may be realized by a cloud server (virtual server).

Figure 3:
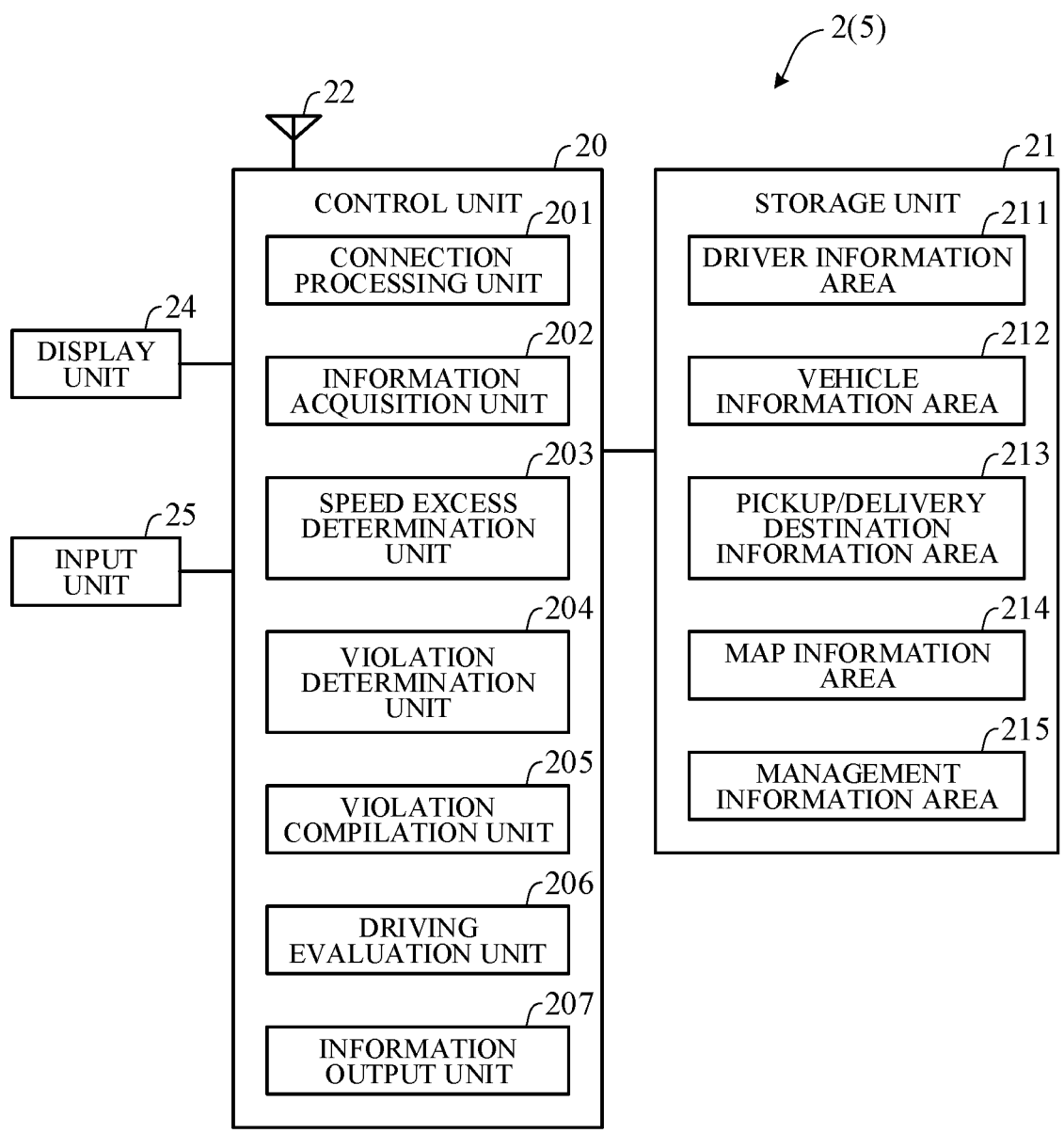
FIG. 3 is a block diagram showing a schematic configuration of a management server in FIG. 1.

FIG. 3 is a block diagram showing a schematic configuration of the management server 2. As shown in FIG. 3, the management server 2 includes a control unit 20, a storage unit 21, a communication unit 22, a display unit 24, and an input unit 25. The display unit 24 and input unit 25 may be omitted, or may consist of other information terminals (not shown) connected to the management server 2.

The storage unit 21 consists of a semiconductor memory, hard disk, or the like. The storage unit 21 stores various types of information, such as software including an operating system (OS) and application programs. Various storage areas, such as a driver information area 211, a vehicle information area 212, a pickup/delivery destination information area 213, a map information area 214, and a management information area 215 are ensured in the storage unit 21. An information area is, for example, a table in a database management system, or the like.

Driver information used to manage each driver, such as the name and the belonging base station ID of the driver, is stored in a driver information area 211 so as to be associated with the employee ID of the driver (also referred to as the driver ID), which is identification information of the driver. A vehicle ID, which is identification information of a vehicle used by each driver, such as vehicle 6A or 6B, is also stored in the driver information area 211 so as to be associated with the driver ID of the driver. For example, the manager of the base station previously sets the association of the vehicle ID with the driver ID before starting daily pickup management work.

Information about each vehicle, including the vehicle type, such as four-wheeled vehicle, motorcycle, or bicycle, and the size of the cargo room, is previously stored in the vehicle information area 212 so as to be associated with the ID of the vehicle.

Pickup destination and delivery destination information, including the addresses, phone numbers, pickup details, and designated time slots of the pickup destinations and the delivery destinations, and the drivers A and B assigned to the pickup destinations and the delivery destinations, is stored in the pickup/delivery destination information area 213.

Map information is previously stored in the map information area 214. The map information includes road link information, map data for displaying the background, such as roads and road maps, information about road types (general road, highway), and the like. The map information includes information on the legal speed of each road and the position of an intersection (stop sign area) where vehicles are required to be stopped. Such map information is updated periodically.

Management information previously set by the manager to evaluate the driving status of each driver, for example, information indicating the time-series locations of the drivers A and B or vehicles 6A and 6B and the speed and acceleration acquired from the driver terminals 1A and 1B, is stored in a management information area 215. The management information includes, for example, threshold value for determining stop sign violation, sudden braking, speed excess, and the like. The threshold value for determining stop sign violation includes location information of a stop determination area set in a range, for example, a circular range having a radius of about 40 m, before a stop line (geo-fence information) and information indicating the direction in which the vehicle enters the stop determination area (reference entry direction) when the vehicle should stop. The threshold value for determining sudden braking include the threshold value of acceleration (e.g., deceleration of 10 km/h/s or more). The threshold value VL for determining speed excess include a threshold value for determining whether the legal speed is exceeded, a threshold value VR for determining whether the regulation speed is exceeded, and location information of a speed management area AR in which it is determined whether the regulation speed is exceeded. While the determination of sudden braking involves simply determining whether a predetermined deceleration or more has occurred, inappropriate driving behaviors, such as stop sign violation, speed excess, or sudden braking, which are unpreferable in terms of safe driving are regarded as traffic violations in the following description.

While stop determination areas, speed management areas AR, and the threshold values VL, VR for determining the legal speed or regulation speed are set considering location information of the stop sign area and road-specific legal speeds or regulation speeds included in map information stored in a map information area 214, the manager may set (change) them arbitrarily. For example, an intersection without a stop obligation may be additionally registered as a stop determination area. Also, considering an error in location and speed measurement using GPS satellites, a location in which it is difficult to accurately determine whether stop sign violation or speed excess has occurred, due to the width or shape of the road may be excluded from the stop determination areas or speed management areas AR.

Figure 4:
FIG. 4 is a diagram showing speed management areas.

FIG. 4 is a diagram showing speed management areas AR and shows two speed management areas AR1 and AR2 set by the manager as an example. In the case of an area in which multiple roads having different regulation speeds are adjacent to each other, it may be erroneously determined that the driver is traveling a road different from the actual one, due to an error in location information based on a GPS signal. Thus, a regulation speed excess determination threshold value VR different from one that should be actually applied may be applied. In this case, the driving status of the driver may not be properly evaluated. In terms of the foregoing, for example, the speed management areas AR1 and AR2 may be set so as to be spaced from each other, as shown in FIG. 4.

The legal speed is a speed set for each vehicle type. In the case of general roads, the legal speed of automobiles and motorcycles is set to 60 km/h, and the legal speed of motorized bicycles to 30 km/h. On the other hand, the regulation speed is set for each road and shown to drivers by a road sign or road marking. Threshold values VL and VR for determining whether the legal speed or regulation speed has been exceeded may be set to greater values than the legal speed or regulation speed considering an error in the speed measured using GPS satellites. For example, the threshold value VL for determining whether the legal speed of a motorized bicycle 6B has been exceeded is set to 40 km/h, which is higher than the legal speed of 30 km/h by 10 km/h.

Also, information indicating the location and date and time of a traffic violation determined on the basis of the management information and information indicating the location of the vehicle 6A or 6B, speed, and acceleration, and violation information including the driver ID of the driver A or B that has committed the violation are stored in the management information area 215. The violation information is stored such that the location of each traffic violation is associated with a driver ID.

To communicate with the driver terminals 1A and 1B, the communication unit 22 implements a communication protocol capable of wireless communication, such as 3G, LTE, 4G, or 5G. On the other hand, to communicate with the manager terminal 3, the communication unit 22 implements a communication protocol capable of wired communication (e.g., Internet line or the like) or wireless communication.

The control unit 20 includes a processor having a CPU, RAM, ROM, I/O or the like. The control unit 20 has a connection processing unit 201, an information acquisition unit 202, a speed excess determination unit 203, a violation determination unit 204, a violation compilation unit 205, a driving evaluation unit 206, and an information output unit 207, as a functional configuration.

The connection processing unit 201 processes login from the driver terminal 1A or 1B and connects the driver terminal 1A or 1B to the management server 2, as well as processes logout from the driver terminal 1A or 1B and completes the connection between the driver terminal 1A or 1B and the management server 2. The connection processing unit 201 also processes login from the manager terminal 3 and connects the manager terminal 3 to the management server 2, as well as processes logout from the manager terminal 3 and completes the connection between the manager terminal 3 and management server 2.

The information acquisition unit 202 acquires various types of information by receiving data transmitted from the driver terminals 1A and 1B to the management server 2 and data transmitted from the manager terminal 3 to the management server 2, through the communication unit 22. The information acquired by the information acquisition unit 202 includes location information, travel speed information, and acceleration information of the vehicles 6A and 6B transmitted from the location information notification units 103 and the speed information notification unit 104 of the driver terminals 1A and 1B and time information corresponding to these information, management information and a driving evaluation information output request transmitted from the manager terminal 3, and the like. The location information is specifically represented by latitude and longitude.

Figure 5A:
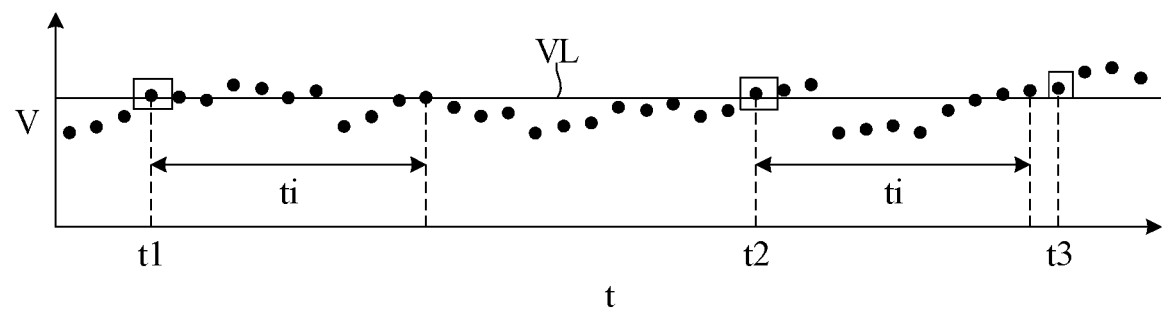
FIG. 5A is a diagram showing a legal speed excess determination.

The speed excess determination unit 203 determines whether the travel speed of the vehicle 6A or 6B has exceeded the determination threshold values VL, VR for the legal speed or the regulation speed. FIG. 5A is a diagram showing a determination as to whether the legal speed has been exceeded and shows changes in the speed V of the driver A or B or vehicle 6A or 6B for each predetermined time period using time-series plots. The speed excess determination unit 203 determines whether the speed V of the driver A or B or vehicle 6A or 6B has exceeded the legal speed excess determination threshold value VL.

If the speed excess determination unit 203 determines that the speed V has exceeded the determination threshold value VL, the violation determination unit 204 determines that a legal speed violation has occurred, counts the violation, and then stops the legal speed excess determination for a predetermined time period ti (e.g., 10 s). Subsequently, if the speed excess determination unit 203 again determines that the speed V has exceeded the determination threshold value VL, the violation determination unit 204 again determines that a legal speed violation has occurred and counts the violation. In this way, three violations are counted in an example of FIG. 5A. When the violation determination unit 204 determines that a legal speed violation has occurred, information indicating the location and date and time of the legal speed excess and violation information including the driver ID of the driver A or B who has exceeded the legal speed are stored in a management information area 215.

When making a speed excess determination in order to evaluate the driving status, it is preferred to determine that a legal speed excess or regulation speed excess has occurred and to count the violation only when such a speed excess has continued for more than a predetermined time period. However, depending on the radio situation or the like, it may be difficult to acquire location information using the GPS sensor 13a. For this reason, use of continuation of a speed excess for more than the predetermined time period as a threshold value for determining a speed excess makes it difficult to properly evaluate the driving status of the vehicle. That is, even if a speed excess has actually continued for more than the predetermined time period, it may not be determined that a speed excess has occurred. To address this problem, in the present embodiment, if the legal speed or regulation speed has been exceeded even once, it is determined that a speed excess has occurred and the violation is counted. On the other hand, if the number of times a speed excess is determined is increased, for example, from several tens of times to several hundred times, there occur concerns, such as an increase in the management burden on the manager, who checks whether a traffic violation has occurred. For this reason, the number of times of determination is limited by stopping determination for the predetermined time period ti after determining that a speed excess has occurred.

The violation determination unit 204 also determines whether the speed of the vehicle 6A or 6B has exceeded the regulation speed. The violation determination unit 204 first determines whether the driver A or B or vehicle 6A or 6B is within the speed management area AR (e.g., the speed management area AR1 or AR2 of FIG. 4), on the basis of location information stored in the management information area 215.

Figure 5B:
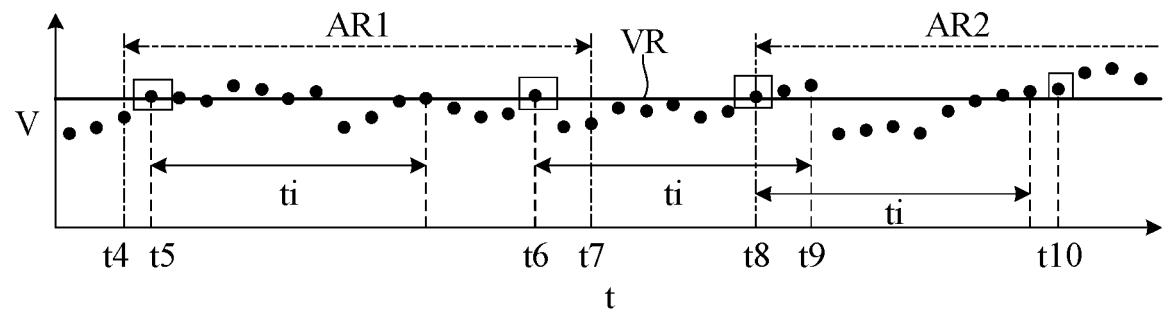
FIG. 5B is a diagram showing a regulation speed excess determination.

FIG. 5B is a diagram showing a determination as to whether the regulation speed has been exceeded and shows changes in the speed V of the driver A or B or vehicle 6A or 6B for each predetermined time period using time-series plots. If the violation determination unit 204 determines that the driver A or B or vehicle 6A or 6B is within the speed management area AR1 or AR2, the speed excess determination unit 203 determines whether the speed V of the driver A or B or vehicle 6A or 6B has exceeded the regulation speed excess determination threshold value VR. If the speed excess determination unit 203 determines that the speed V has exceeded the determination threshold value VR, the violation determination unit 204 determines that a regulation speed violation has occurred, counts the violation, and then stops determining whether the regulation speed has been exceeded in the same speed management area AR1 or AR2, for the predetermined time period ti (e.g., 10 s). When the violation determination unit 204 determines that a regulation speed violation has occurred, information indicating the location and date and time of the regulation speed excess and violation information including the driver ID of the driver A or B who has exceeded the regulation speed are stored in the management information area 215.

As shown in FIG. 4, after the driver A or B or vehicle 6A or 6B exits from the predetermined speed management area AR1, the driver or vehicle may move toward another speed management area AR2 as shown by a linear arrow and may also repeatedly enter and exit the speed management area AR1 as shown by a meandering arrow. The latter situation is more likely to occur when the driver A or B or vehicle 6A or 6B is moving near the periphery of the speed management area AR1 or AR2. That is, although the driver or vehicle is actually moving within the speed management area AR1 or AR2, it may be determined that the driver or vehicle is repeatedly entering and exiting the speed management area AR1 or AR2, due to an error in location information based on a GPS signal.

For this reason, in the present embodiment, for the predetermined time period ti after determining that a regulation speed excess has occurred, determination as to whether a regulation speed excess has occurred in the same speed management area AR1 or AR2 is stopped. Since a clocking unit continuously measures the predetermined time period ti regardless of whether the driver A or B or vehicle 6A or 6B is within the speed management area AR1 or AR2, the number of times of determination is limited even if the driver or vehicle repeatedly enters and exits the speed management area AR1 or AR2 or it is determined so.

Further, the violation determination unit 204 determines whether the drivers A, B or the vehicle 6A, 6B has violated a stop obligation, on the basis of location information of the stop sign areas and information indicating the reference entry directions stored in the management information area 215. That is, the violation determination unit 204 determines whether the driver A or B or vehicle 6A or 6B has entered a stop sign area from the reference entry direction, as well as determines whether the speed has fallen below a threshold value (e.g., 4 km/h) in a period from entry into the stop sign area to exit therefrom. If the violation determination unit 204 determines that the driver A or B or vehicle 6A or 6B has violated the stop obligation, information indicating the location and date and time of the stop sign violation and violation information including the driver ID of the driver A or B who has violated the stop obligation are stored in the management information area 215.

The violation determination unit 204 also determines whether the driver A or B has performed sudden braking, on the basis of information indicating the threshold value of acceleration stored in the management information area 215. Specifically, the violation determination unit 204 determines whether the magnitude of negative acceleration during a deceleration is equal to or greater than the threshold value of acceleration (e.g., 10 km/h/s) stored in the management information area 215. If the violation determination unit 204 determines that sudden braking has been performed, information indicating the location and date and time of the sudden braking and violation information including the driver ID of driver A or B that has performed the sudden braking are stored in the management information area 215.

The violation compilation unit 205 compiles the numbers of violations of the groups managed by the distribution center's manager or the individual drivers belonging to the groups, in accordance with the driving evaluation information output request transmitted from the manager terminal 3. The numbers of violations are compiled on the basis of the violation information stored in the management information area 215.

Figure 6:
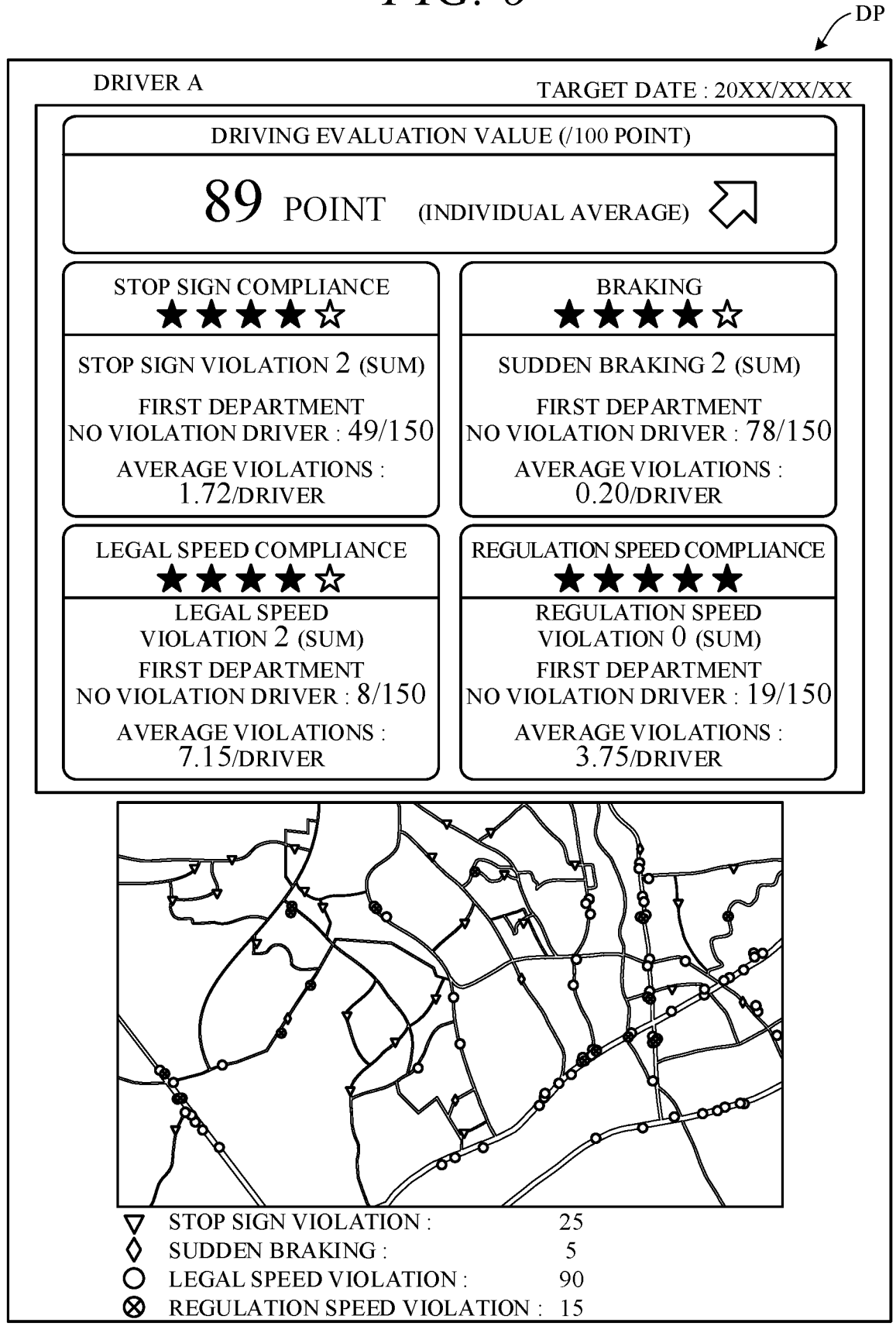
FIG. 6 is a diagram showing driving evaluation information.

The driving evaluation unit 206 generates driving evaluation information in accordance with the driving evaluation information output request transmitted from the manager terminal 3. FIG. 6 is a diagram showing driving evaluation information. The driving evaluation information is generated on the basis of the number of violations compiled by the violation compilation unit 205. FIG. 6 show a screen displayed on the manager terminal 3 and is a screen through which the manager of the distribution center requests and views driving evaluation information of the group managed by the manager or the individual drivers belonging to the group (driving evaluation screen DP).

When the manager specifies the compilation target date and target group or driver whose driving evaluation the manager wants to view and inputs a driving evaluation information view request, the manager terminal 3 transmits a driving evaluation information output request to the management server 2. In an example in FIG. 6, the driver A is specified. Upon receipt of such a driving evaluation information output request, the violation compilation unit 205 compiles the number of violations on the compilation target date of the specified target group or driver for each of multiple evaluation items (stop, brake operation, legal speed, and regulation speed). The driving evaluation unit 206 calculates the driving evaluation score, for example, by deduction, in accordance with the numbers of traffic violations compiled by the violation compilation unit 205, as well as ranks the target driver or group and generates driving evaluation information. As shown in FIG. 6, the driving evaluation screen DP also displays an arrow corresponding to a case in which the current driving evaluation score is higher than the preceding one, a case in which it is the same as the preceding one, or a case in which it is lower than the preceding one, a number of stars indicating the level of safe driving, the violation statuses of the other drivers, and the like.

The driving evaluation screen DP also displays a map of the management area of the distribution center indicating the locations of traffic violations. This allows the manager to grasp locations in which a traffic violation is more likely to occur in the control area. The manager is able to use the driving evaluation information to evaluate the group managed by the manager or the individual drivers belonging to the group or give guidance on safe driving thereto.

The information output unit 207 outputs various types of information by transmitting data from the management server 2 to the manager terminal 3 through the communication unit 22. For example, the information output unit 207 transmits the driving evaluation information to the manager terminal 3.

Figure 7A:
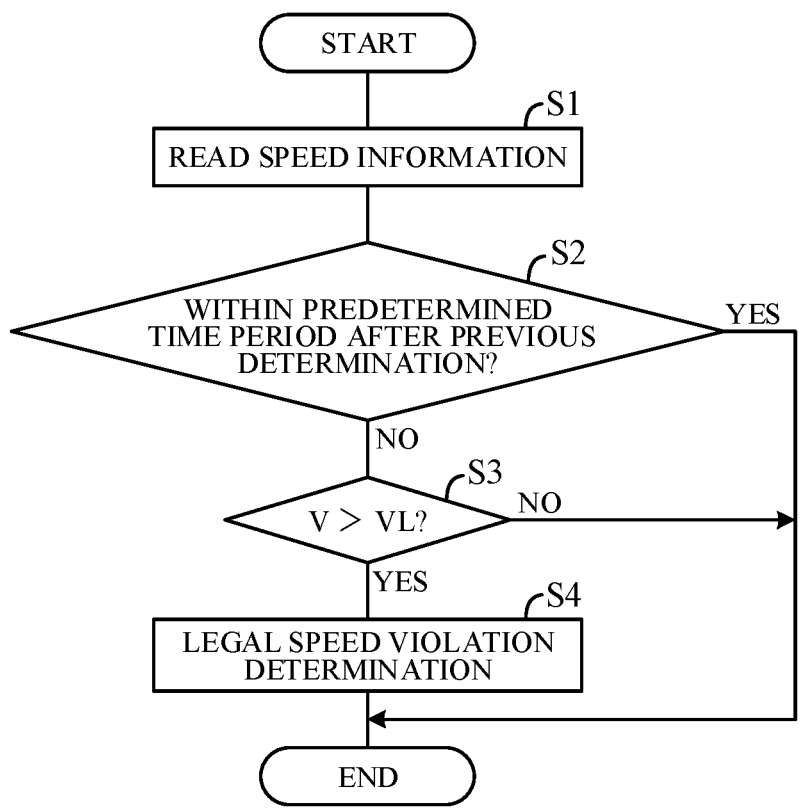
FIG. 7A is a flowchart showing an example of the legal speed excess determination process performed by the management server in FIG. 3.
Figure 7B:
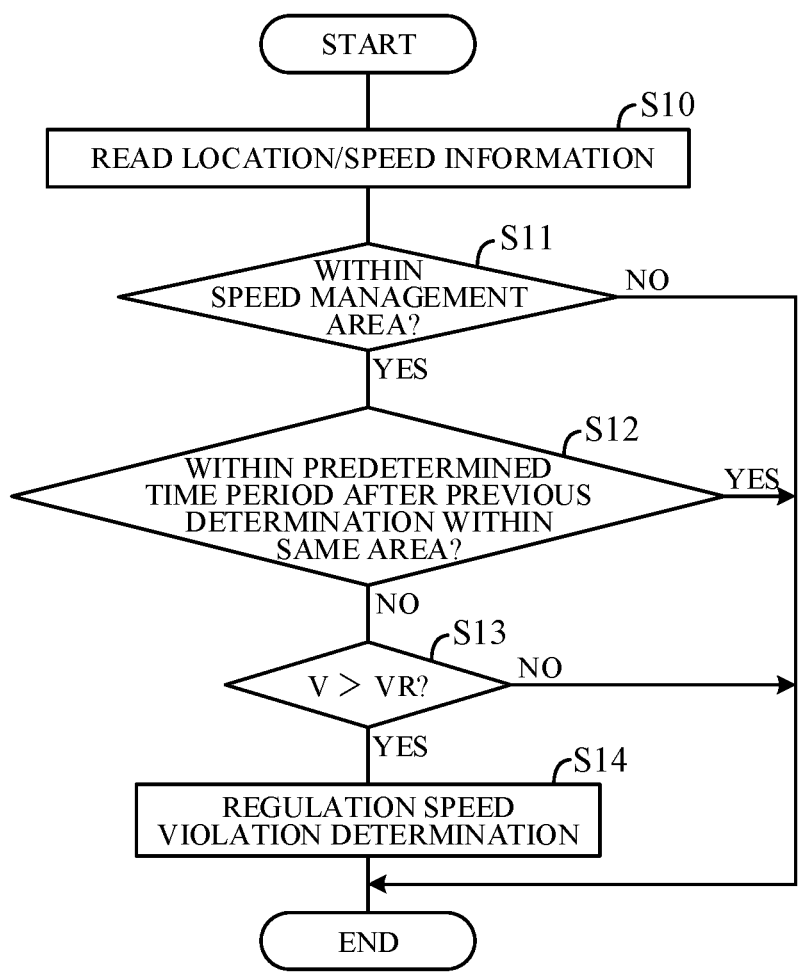
FIG. 7B is a flowchart showing an example of the regulation speed excess determination process performed by the management server in FIG. 3.

FIG. 7A is a flowchart showing an example of the legal speed excess determination process, and FIG. 7B is a flowchart showing an example of the regulation speed excess determination process, both performed by the CPU of the management server 2 in accordance with a program stored in advance. These processes shown in the flow charts are started, for example, when the management server 2 is powered on and repeated in a predetermined time interval.

In the legal speed excess determination process shown in FIG. 7A, first, in step S1, the information acquisition unit 202 acquires the travel speed information of the vehicle 6A, 6B and the corresponding time information received from the speed information notification unit 104 of the driver terminal 1A, 1B through the communication unit 22. Next, in step S2, the violation determination unit 204 determines whether the predetermined time period ti has not been elapsed after the previous determination that legal speed excess has occurred. When step S2 is negative, the process proceeds to step S3, when step S2 is affirmative, the process ends. In step S3, the speed excess determination unit 203 determines whether the travel speed V of the vehicle 6A, 6B has exceeded the legal speed determination threshold value VL. When step S3 is affirmative, the process proceeds to step S4, when step S3 is negative, the process ends. In step S4, the violation determination unit 204 determines that the driver A, B has exceeded the legal speed to count the legal speed violation.

In the regulation speed excess determination process shown in FIG. 7B, first, in step S10, the information acquisition unit 202 acquires the location information and the travel speed information of the vehicle 6A, 6B and the corresponding time information received from the location information notification unit 103 and the speed information notification unit 104 of the driver terminal 1A, 1B through the communication unit 22. Next, in step S11, the violation determination unit 204 determines whether the driver A, B or the vehicle 6A, 6B is in the speed management area AR based on the location information. When step S11 is affirmative, the process proceeds to step S12, when step S11 is negative, the process ends. In step S12, the violation determination unit 204 determines whether the predetermined time period ti has not been elapsed after the previous determination that regulation speed excess has occurred in the same speed management area AR. When step S12 is negative, the process proceeds to step S13, when step S12 is affirmative, the process ends.

In step S13, the speed excess determination unit 203 determines whether the travel speed V of the vehicle 6A, 6B has exceeded the regulation speed determination threshold value VR. When step S13 is affirmative, the process proceeds to S14, when step S13 is negative, the process ends. In step S14, the violation determination unit 204 determines that the driver A, B has exceeded the regulation speed to count the regulation speed violation.

Thus, if the speed excess determination threshold value VL, VR is exceeded even once, it is determined that there is a speed excess (step S3, S13), even when it is impossible to acquire the location information by the GPS sensor 13a depending on radio wave conditions or the like it is possible to determine the speed excess. In addition, since the determination is stopped for the predetermined time period ti after the determination of the excessive speed, it is possible to prevent the number of determinations from becoming excessive and to reduce the administrative burden on the manager who confirms the occurrence state of the traffic violation. In addition, since it is possible to appropriately count the violations of the driver who continuously or intermittently exceed the speed for over the predetermined time period ti, it is possible to appropriately evaluate the driving status of the driver.

<Manager Terminal 3>

Next, the manager terminal 3 will be described. The manager terminal 3 is used by the manager of the distribution center to check the numbers of traffic violations of the drivers A and B who drive the vehicles 6A and 6B and pick up and deliver cargoes and to evaluate the driving status of these drivers. The manager terminal 3 is any type of computer, such as a personal computer, tablet terminal, or smartphone, disposed in the base station and transmits and receives information to and from the management server 2 through the network 4.

Figure 8:
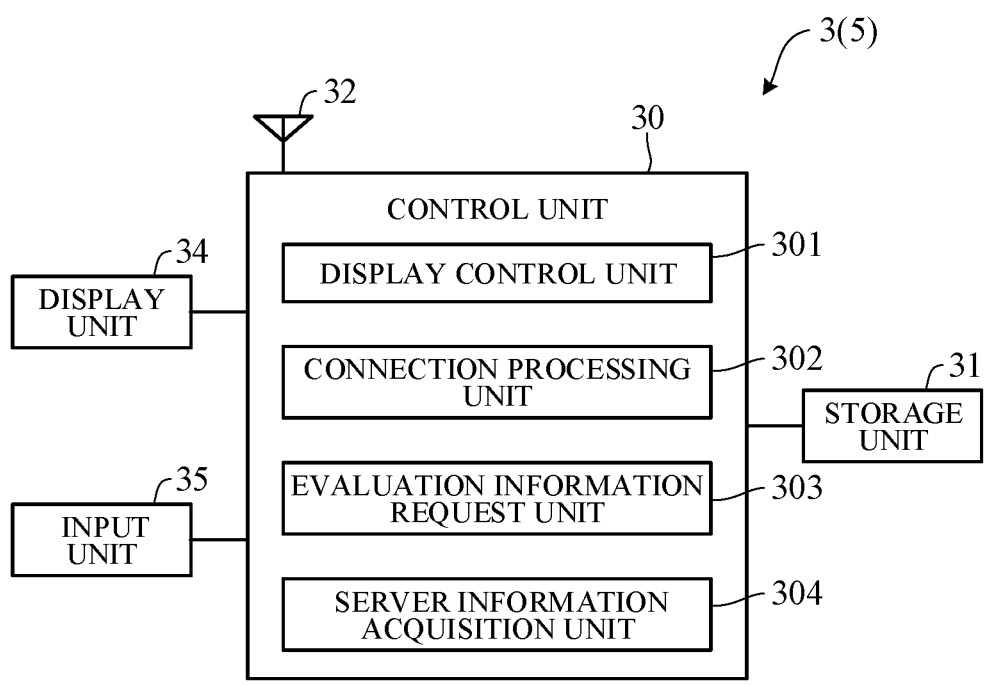
FIG. 8 is a block diagram showing a schematic configuration of a manager terminal in FIG. 1.

FIG. 8 is a block diagram showing a schematic configuration of the manager terminal 3. As shown in FIG. 8, the manager terminal 3 includes a control unit 30, a storage unit 31, a communication unit 32, a display unit 34, and an input unit 35.

The storage unit 31 consists of a semiconductor memory, hard disk, or the like. The storage unit 31 stores various types of information, such as software including an operating system (OS) and application programs.

The communication unit 32 implements a communication protocol capable of wired communication (e.g., the Internet line or the like) or wireless communication, such as 3G, LTE, 4G, or 5G, and is connected to the management server 2 to transmit and receive various types of data to and from the management server 2.

The display unit 34 consists of a display device, such as a liquid crystal display or organic EL panel. Upon receipt of an instruction from the control unit 30, the display unit 34 displays a map, a button icon for operating a touchscreen, or the like. The display unit 34 also displays the driving evaluation information and the like (FIG. 6).

The input unit 35 consists of physical switches, such as a numeric keypad operated by the manager, an input device (not shown), such as a touchscreen, disposed so as to be overlaid on the display surface of the display unit 34, or the like. A command to change the screen display on the display unit 34 is inputted through the input unit 35. Management information for evaluating the driving status of the drivers can be set through the input unit 35.

The control unit 30 includes a processor having a CPU, RAM, ROM, I/O or the like. The control unit 30 has a display control unit 301, a connection processing unit 302, an evaluation information request unit 303, and a server information acquisition unit 304, as a functional configuration.

The display control unit 301 controls the screen display on the display unit 34 by generating an image signal in response to an operation on the input unit 35 and transmitting the image signal to the display unit 34. The screens that the display control unit 301 causes the display unit 34 to display include a login screen for logging in to the management system 100, the driving evaluation screen DP for displaying the driving evaluation information, and the like.

The connection processing unit 302 processes login to the management server 2 using, for example, an identification number for identifying the manager or person in charge of the base station (base station manager ID) and a password.

The evaluation information request unit 303 transmits a driving evaluation information output request to the management server 2 in accordance with an operation on the input unit 35 by the manager.

The server information acquisition unit 304 acquires driving evaluation information or the like transmitted from the management server 2 (information output unit 207). Thus, for example, the driving evaluation information is displayed on the driving evaluation screen DP of FIG. 6.

[Operation of Management System 100]

Next, referring to FIGS. 5A and 5B, an example of the operation of the management apparatus 100 will be described. For example, when departing from the distribution center, that is, when starting work, the driver A who drives the vehicle 6A inputs his or her login ID and a password on the login screen displayed on the display unit 14 of the driver terminal 1A through the input unit 15. Thus, the management server 2 processes connection from the driver terminal 1A. Subsequently, the driver terminal 1A communicates with the management server 2 at predetermined time intervals (e.g., at intervals of 1 s), for example, transmits location information of the driver A or vehicle 6A to the management server 2. The communication between the driver terminal 1A and management server 2 continues until the driver terminal 1A logs out.

As shown in FIG. 5A, if it is determined that the speed V of the driver A or vehicle 6A has exceeded the legal speed excess determination threshold value VL for less than the predetermined time period ti from time t1 during the communication between the driver terminal 1A and management server 2, it is determined that a regulation speed violation has occurred at time t1 and one violation is counted (steps S1 to S4). On the other hand, if it is determined that the speed V has continuously exceeded the determination threshold value VL for more than the predetermined time period ti from time t2, it is determined that violations have occurred at time t2 and time t3, which is later than time t2 by more than the predetermined time period ti, and two violations are counted (steps S1 to S4). By counting one violation when a speed excess has occurred for less than the predetermined time period ti and, on the other hand, counting multiple violations when a speed excess has continued for more than the predetermined time period ti, the number of violations reflecting the driving status of the driver can be counted without increasing the amount of data of violation information or the management burden.

As shown in FIG. 5B, if it is determined that the driver A or vehicle 6A has entered the speed management area AR1 at time t4 and it is determined that the speed V of the driver A or vehicle 6A has exceeded the regulation speed excess determination threshold value VR at time t5 and time t6, it is determined that regulation speed violations have occurred at time t5 and time 6 and two violations are counted (steps S10 to S14). If it is determined that the driver A or vehicle 6A has exited the speed management area AR1 at time t7, the regulation speed excess determination is stopped (step S11).

If it is determined that the driver A or vehicle 6A has entered another speed management area AR2 with the speed thereof exceeding the determination threshold value VR at time t8, which is within the predetermined time period ti from time t6, at which it has been determined last time that the violation has occurred in the speed management area AR1, it is determined that a new violation has occurred and one violation is counted (steps S10 to S14). A violation determination is not made within (time t9, etc.) the predetermined time period ti from time t8, at which it has been determined that the violation has occurred in the speed management area AR2, and a violation determination is made again at time t10 and later (steps S10 to S14). As seen above, after determining that the regulation speed excess has occurred, determination as to whether a violation has occurred in the same speed management area AR is stopped for the predetermined time period ti. Thus, even if the driver or vehicle repeatedly enters and exits the speed management area AR or it is determined so, the number of times of determination can be limited.

On the other hand, the manager of the distribution center to which the driver A belongs inputs the center manager ID and a password on the login screen displayed on the display unit 34 of the manager terminal 3 through the input unit 35. Thus, the management server 2 processes connection from the manager terminal 3. The driving evaluation screen DP showing driving evaluation information of the group managed by the manager or the driver A belonging to the group is displayed on the display unit 34 of the manager terminal 3 in accordance with an operation by the manager (FIG. 6). The manager is able to use the driving evaluation information to evaluate the group managed by the manager or the individual drivers belonging to the group or give guidance on safe driving thereto. While, in the present embodiment, determination as to whether a legal speed excess or regulation speed excess has occurred is stopped for the predetermined time period after determining that such a speed excess has occurred, determination as to whether a stop sign violation or sudden braking has occurred may also be stopped for the predetermined time period after determining that such a violation or the like has occurred.

The present embodiment can achieve advantages and effects such as the following:

(1) The driving evaluation apparatus 5 is configured to evaluate driving status of the driver A, B driving the vehicle 6A, 6B in the preset speed management area AR (AR1, AR2). The driving evaluation apparatus 5 includes: the information acquisition unit 202 configured to acquire location information and travel speed information of the vehicle 6A based on GPS signals received by the GPS sensor 13a provided on the driver terminal 1A, 1B carried by the driver A, B; the speed excess determination unit 203 configured to conduct speed excess determination to determine whether the travel speed V of the vehicle 6A in the speed management area AR exceeds the legal speed violation determination threshold value VL or the regulation speed violation determination threshold value VR based on the location information and the travel speed information of the vehicle 6A acquired by the information acquisition unit 202; and the driving evaluation unit 206 configured to evaluate the driving status of the driver A, B in the speed management area AR based on determination result of the speed excess determination unit 203 (FIG. 3). The speed excess determination unit 203 is configured to stop the speed excess determination for the predetermined time period ti when it is determined that the travel speed V of the vehicle 6A exceeds the determination threshold value VL, VR. With this configuration, since it is possible to judge the excess speed regardless of the reception state of the GPS signals, it is possible to appropriately evaluate the driving status of the driver, and it is possible to reduce the administrative burden on the manager who confirms the occurrence state of the traffic violation by limiting the number of times of judgment of the excess speed.

(2) The driving evaluation apparatus 5 further includes: a timer configured to count time from a time point when it is determined by the speed excess determination unit 203 that the travel speed V of the vehicle 6A exceeds the determination threshold value VL, VR to a time point when the predetermined time period ti elapses. The speed excess determination unit 203 is configured to stop the speed excess determination until the timer finishes counting the predetermined time period ti, irrespective of whether the vehicle 6A is in the speed management area AR. With this, since the number of times of determination of the excess speed can be limited even in the case of repeating the entry and exit to and from the speed management area AR or making such determination, it is possible to reduce the administrative burden on the manager who confirms the occurrence state of the traffic violation.

The above embodiment can be modified to various forms. Hereinafter, modified examples will be described. In the above embodiment, although an example has been described in which the driving evaluation apparatus 5 evaluates the level of safe driving of the driver who drives the vehicle and performs the pickup and delivery work, a driving evaluation apparatus may be any configuration as long as it evaluates level of safe driving of worker in charge of driving vehicle during work hours.

In the above embodiment, although the GPS sensor 13a is mounted on the driver terminal 1A, 1B carried by the driver A, B, a GPS receiver may be any configuration as long as it is provided on mobile terminal carried by the driver or the mobile body.

In the above embodiment, although the information acquisition unit 202 acquires the location information and the speed information calculated on the side of the driver terminal 1A, 1B, configuration of an information acquisition unit that acquires location information and speed information of the mobile body is not limited to this. For example, based on the GPS signals received on the side of the driver terminal 1A, 1B, location or speed may be calculated by the management server 2.

In the above embodiment, although the speed excess determination unit 203 determines whether the travel speed V of the vehicle 6A, 6B exceeds the determination threshold value VL, VR set higher than the legal speed or the regulation speed, for example, by 10 km/h, configuration of a speed excess determination unit conducting a speed excess determination to determine whether a travel speed of the mobile body exceeds a predetermined travel speed is not limited to such. For example, speed excess determination may be conducted using a determination threshold value set in accordance with the traffic situation for each area. The determination threshold value of an area, such as a residential area or a school route, which should particularly be considered for traffic safety, may be set to be lower than the regulation speed at the determination of each distribution center. In addition, although the driving evaluation value is calculated by the subtraction method in accordance with the number of traffic violations, the number of subtraction points may be increased in violations in particular areas where traffic safety should be considered.

In the above embodiment, although the violation determination unit 204 determines that there is a speed excess when exceeding the speed excess determination threshold value VL, VR even once, configuration of a driving evaluation unit evaluating driving status of the driver is not limited to such. For example, determination condition of the speed excess may be set to a threshold value excess of two or more times. That is, it is sufficient to set determination condition so as not to be affected by data deficiency due to the reception status of the GPS signals.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 1A, 1B driver terminal, 2 management server, 3 manager terminal, 4 network, 5 driving evaluation apparatus, 6A, 6B vehicle, 10 control unit, 11 storage unit, 12 wireless unit, 13 sensor unit, 13a GPS sensor, 13b gyro sensor, 14 display unit, input unit, 20 control unit, 21 storage unit, 22 communication unit, 24 display unit, 25 input unit, 30 control unit, 31 storage unit, 32 communication unit, 34 display unit, 35 input unit, 100 management system, 101 display control unit, 102 connection processing unit, 103 location information notification unit, 104 speed information notification unit, 201 connection processing unit, 202 information acquisition unit, 203 speed excess determination unit, 204 violation determination unit, 205 violation compilation unit, 206 driving evaluation unit, 207 information output unit, 211 driver information area, 212 vehicle information area, 213 pickup/delivery destination information area, 214 map information area, 215 management information area, 301 display control unit, 302 connection processing unit, 303 evaluation information request unit, 304 server information acquisition unit, DP driving evaluation screen

The invention claimed is:

1. A driving evaluation apparatus configured to evaluate a driving status of a driver driving a mobile body in a preset determination area, comprising:
a microprocessor and a memory coupled to the microprocessor, wherein
the microprocessor is configured to function as:
an information acquisition unit configured to acquire location information and travel speed information of the mobile body based on GPS signals received by a GPS receiver provided on a mobile terminal carried by the driver or provided on the mobile body;
a speed excess determination unit configured to conduct a speed excess determination to determine whether a travel speed of the mobile body in the determination area exceeds a predetermined travel speed based on the location information and the travel speed information of the mobile body acquired by the information acquisition unit;
a driving evaluation unit configured to evaluate the driving status of the driver in the determination area based on a determination result of the speed excess determination unit; and
a timer configured to count time from a time point when it is determined by the speed excess determination unit that the travel speed of the mobile body exceeds the predetermined travel speed to a time point when the predetermined time period elapses, wherein
the speed excess determination unit is configured to stop the speed excess determination for a predetermined time period when it is determined that the travel speed of the mobile body exceeds the predetermined travel speed until the timer finishes counting the predetermined time period, irrespective of whether the mobile body is in the determination area.

2. The driving evaluation apparatus according to claim 1, wherein
the determination area includes a first determination area and a second determination area separated from the first determination area, wherein
the speed excess determination unit is configured to restart the speed excess determination when the mobile body exits the first determination area and enters the second determination area, irrespective of whether the timer finishes counting.

3. A driving evaluation apparatus configured to evaluate a driving status of a driver driving a mobile body in a preset determination area, comprising:
a microprocessor and a memory coupled to the microprocessor, wherein
the microprocessor is configured to perform:
acquiring location information and travel speed information of the mobile body based on GPS signals received by a GPS receiver provided on a mobile terminal carried by the driver or provided on the mobile body;
conducting a speed excess determination to determine whether a travel speed of the mobile body in the determination area exceeds a predetermined travel speed based on the location information and the travel speed information of the mobile body acquired in the acquiring;
evaluating the driving status of the driver in the determination area based on a determination result of the speed excess determination; and
counting time from a time point when it is determined in the speed excess determination that the travel speed of the mobile body exceeds the predetermined travel speed to a time point when the predetermined time period elapses, wherein the microprocessor is configured to perform:
the conducting including stopping the speed excess determination for a predetermined time period when it is determined that the travel speed of the mobile body exceeds the predetermined travel speed until the timer finishes counting the predetermined time period, irrespective of whether the mobile body is in the determination area.

4. The driving evaluation apparatus according to claim 3, wherein
the determination area includes a first determination area and a second determination area separated from the first determination area, wherein
the microprocessor is configured to perform:
the conducting including restarting the speed excess determination when the mobile body exits the first determination area and enters the second determination area, irrespective of whether the timer finishes counting.

* * * * *